United States Patent [19]

Miranda

[11] Patent Number: 4,832,898
[45] Date of Patent: May 23, 1989

[54] VARIABLE DELAY REACTOR PROTECTION SYSTEM

[75] Inventor: Samuel Miranda, Wilkinsburg, Pa.

[73] Assignee: Westinghouse Electric Corp., Pittsburgh, Pa.

[21] Appl. No.: 125,515

[22] Filed: Nov. 25, 1987

[51] Int. Cl.$^4$ ............................................. G21C 7/36
[52] U.S. Cl. ................................. 376/215; 376/211; 376/402
[58] Field of Search ............... 376/215, 211, 402; 60/644.1, 665, 667

[56] References Cited

U.S. PATENT DOCUMENTS

| | | | |
|---|---|---|---|
| 4,231,328 | 11/1980 | Lang et al. | 122/504 |
| 4,290,850 | 9/1981 | Omori | 376/215 |
| 4,424,186 | 1/1984 | Cook | 376/211 |
| 4,478,783 | 10/1984 | Broadwater | 376/211 |
| 4,738,818 | 4/1988 | Cantineau | 376/211 |

Primary Examiner—Donald P. Walsh

[57] ABSTRACT

A system for variably delaying reactor trip and auxiliary feedwater system actuation resulting from a low water condition in a steam generator includes a plurality of sensors for determining both whether a low water condition exists in each steam generator and the power output level of the reactor. The length of the variable time delay is determined based upon the severity of the steam generator low water level condition and the reactor power output level. The reactor is then tripped and the auxiliary feedwater system actuated at the expiration of the time delay period if the steam generator water level is not restored.

18 Claims, 5 Drawing Sheets

VARIABLE DELAY REACTOR PROTECTION SYSTEM

BACKGROUND OF THE INVENTION

1. Field of the Invention

The present invention is directed generally to safely delaying nuclear power plant protective functions and more specifically to the variable delay of steam generator low water level protective functions, i.e., reactor trip and auxiliary feedwater system actuation.

2. Description of the Prior Art

In present nuclear power plant protection systems, a low water level, in any steam generator, will trip the reactor and activate the auxiliary feedwater system. FIG. 1 illustrates one example of auxiliary feedwater system actuation and reactor trip logic in a plant with four steam generators. Low water level indicators associated with each steam generator drive logical OR gate 14 and logical AND gate 15. A low water level indication in one steam generator will cause a signal to be generated which is available at an output of OR gate 14 to thereby initiate a reactor trip and actuate the motor-driven auxiliary feedwater pumps. Likewise, a low water level indication in two or more steam generators will cause a signal to be generated which is available at an output of AND gate 15 to thereby actuate the turbine-driven auxiliary feedwater pump.

These actions are intended to protect the nuclear core and to maintain an adequate heat sink for decay heat removal. The most critical need for such protective action would occur while the plant is operating at full power following a total loss of feedwater to all steam generators or a major feedwater line rupture. Therefore, the steam generator low water level protection system logic and setpoints are determined according to the requirements of these limiting postulated conditions. The same protective functions also occur, however, under less limiting conditions such as the termination of feedwater to only one steam generator during plant startup operations.

A survey of nuclear power plant operating experience indicates that a large number of all unplanned reactor trips are attributable to low steam generator water level trip signals. The removal of unnecessary conservatisms that are inherent in the accident analysis assumptions and models and that are applied to determine the steam generator low water level reactor trip setpoint would permit the low water level trip setpoint to be selectively lowered during plant operation under less-than-limiting conditions and thereby reduce the likelihood that the steam generator water level would fall below the trip setpoint and unnecessarily trip the reactor. Unfortunately, lowering the steam generator low water level trip setpoint is constrained by the physical design of the steam generator. Accordingly, the need exits for a system which is capable of eliminating unnecessary reactor trips.

SUMMARY OF THE INVENTION

The present invention is directed to a system for variably delaying reactor trip and auxiliary feedwater system actuation resulting from a low water condition in one or more steam generators. The system includes a plurality of sensors for determining whether a low water condition exists in each steam generator and for determining the power output level of the reactor. The length of the variable time delay is determined as a function of the severity of the steam generator low water level condition, i.e., the number of steam generators experiencing a low water level condition, and the reactor power output level. The reactor is tripped and the auxiliary feedwater system is actuated at the expiration of the delay period if the steam generator water level is not restored. The delay thus provides time for remedial operator action and the natural stabilization of water level transients. Restoration of the water level during such a delay would avoid unnecessary reactor trips.

One embodiment of the present invention is directed to a system for variably delaying reactor trip and auxiliary feedwater system actuation resulting from a low water condition in one or more steam generators comprised of a plurality of sensors and accompanying logic circuitry which determine the number of steam generators in which a low water level condition has occurred and whether the reactor power output level has exceeded certain predefined power levels (e.g., ten percent and fifty percent of Rated Thermal Power). The system is additionally comprised of a plurality of timers activated upon the detection of a low water level condition. These timers may correspond, for example, to delays of five seconds, thirty seconds, one hundred fifty seconds and two hundred eighty seconds. The length of the effective delay is determined by a plurality of logic gates combined in such a fashion so as to select one of the timer output signals based upon the severity of the steam generator low water level condition and the reactor power output level.

The reactor trip and auxiliary feedwater system actuation are delayed by five seconds if the power level exceeds ten percent of Rated Thermal Power and a low water condition exists in more than one steam generator, by thirty seconds if the power level exceeds fifty percent of Rated Thermal Power and a low water condition exists in any one steam generator, by one hundred fifty seconds if the power level is between ten percent and fifty percent of Rated Thermal Power and a low water condition exists in any one steam generator and by two hundred eighty seconds if the power level is less than ten percent of Rated Thermal Power and a low water condition exists in at least one steam generator. The reactor is tripped and the auxiliary feedwater system is actuated at the expiration of the delay period if the steam generator water level is not restored.

Another embodiment of the present invention is directed to a system for variably delaying reactor trip and auxiliary feedwater system actuation resulting from a low water condition in one or more steam generators comprised of a microprocessor which determines the length of the variable delay in response to a plurality of sensors which determine whether a low water condition exists in each steam generator in addition to the power output level of the reactor. The reactor is tripped and the auxiliary feedwater system is actuated at the expiration of the delay period if the steam generator water level is not restored.

The system for variably delaying reactor trip and auxiliary feedwater system actuation of the present invention enables the reactor protection system to distinguish between a severe low water transient which requires prompt protective action and a less severe low water transient during which protective action may be safely delayed. The application of these delays allows time for steam generator water level transients to stabilize and recover and for the operator to take corrective measures, thus resulting in the elimination of many unnecessary reactor trips. These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments will now be described, by way of example only, with reference to the accompanying figures wherein.

DETAILED DESCRIPTION OF THE PREFERRED EMBODIMENT

Figure 1:
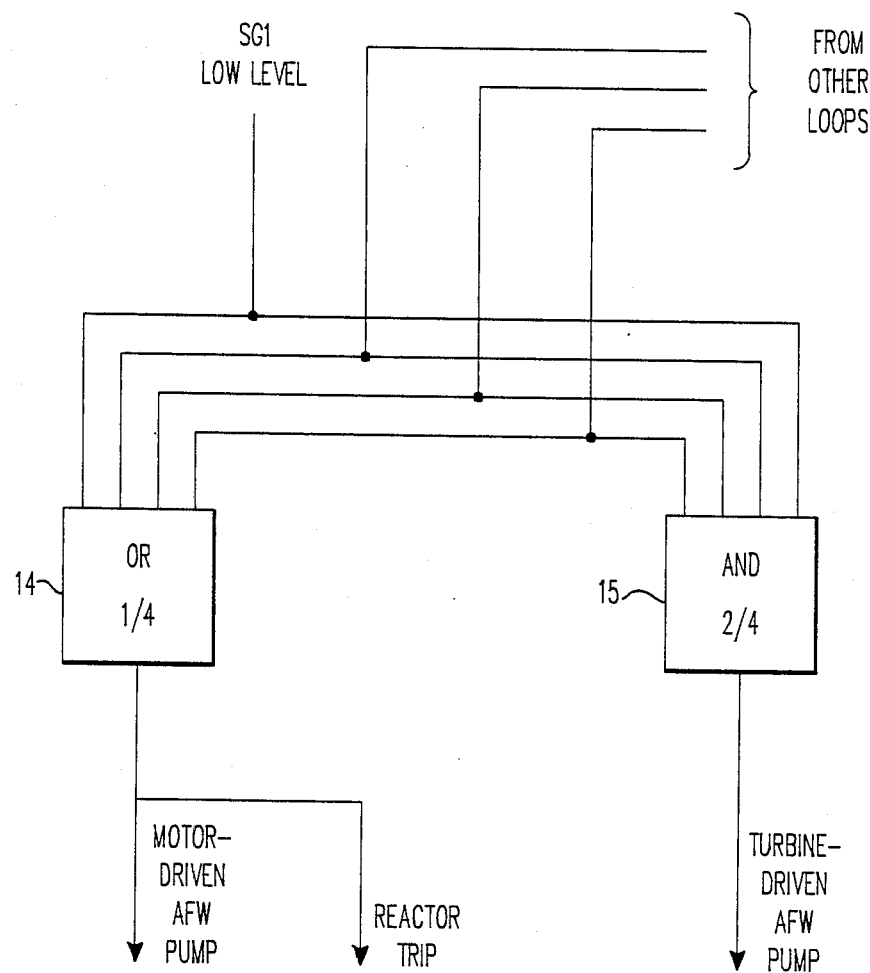
FIG. 1 illustrates a prior art steam generator low water level reactor protection system.
Figure 2:
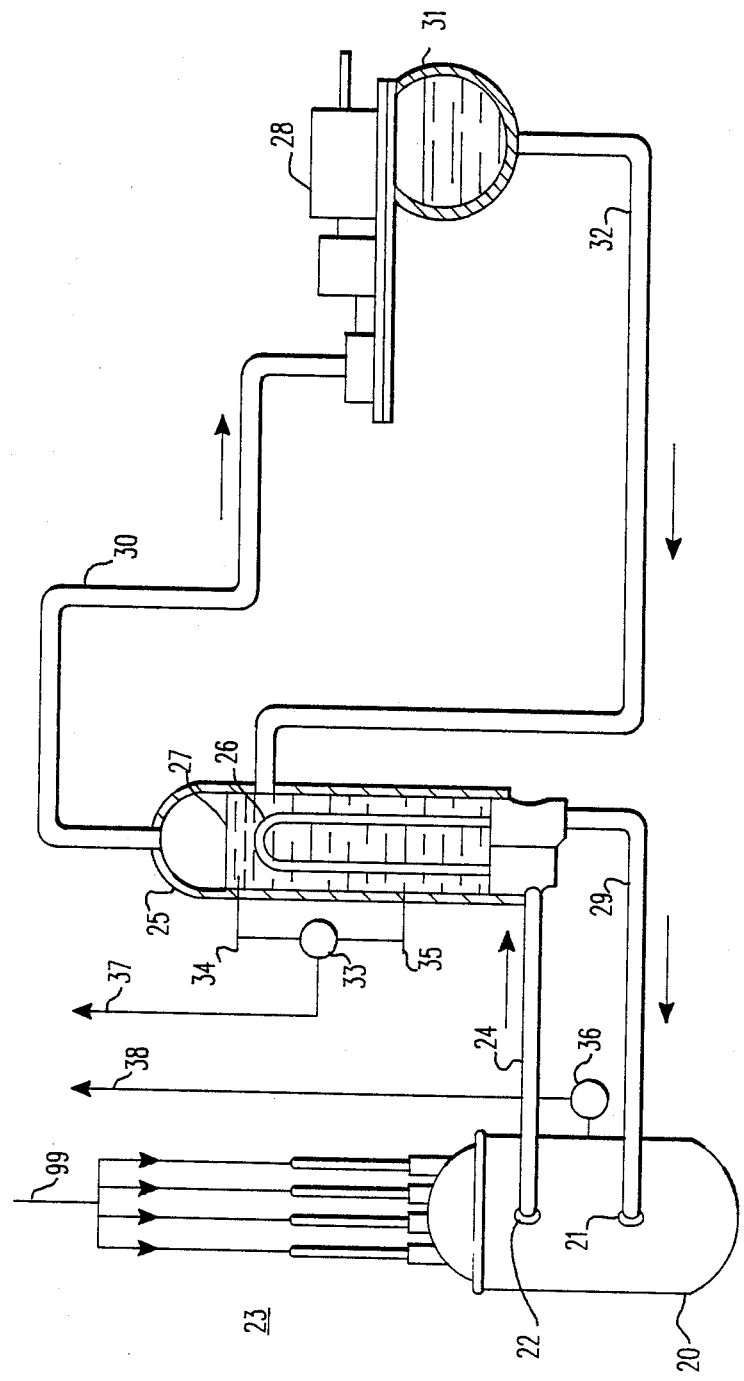
FIG. 2 illustrates a simplified representation of a typical pressurized water reactor-steam generator system.

FIG. 2 illustrates a simplified schematic representation of a typical pressurized water reactor in which the method and apparatus of the present invention to variably delay steam generator low water level reactor protective functions can be employed. The reactor vessel 20 has coolant flow inlet means 21 and coolant flow outlet means 22. The vessel 20 contains a nuclear core (not shown) consisting mainly of a plurality of clad nuclear fuel elements which generate substantial amounts of heat, depending primarily upon the position of control rods 23. The heat generated by the reactor core is conveyed from the core by coolant flow entering through inlet means 21 and exiting through outlet means 22. The flow exiting through outlet means 22 is conveyed through an outlet conduit 24 to a heat exchange steam generator system 25. The heated coolant is conveyed through heat exchange tubes 26 which are in a heat exchange relationship with water 27 which is used to produce steam. The steam produced by the generator 25 is utilized to drive a turbine 28 for the production of electricity as described more fully below. The flow of the coolant is then conveyed from the steam generator 25 through an inlet conduit 29 to inlet means 21. Thus, a closed recycling primary loop couples the reactor vessel 20 and the steam generator 25. The system shown in FIG. 2 is illustrated with one closed fluid flow loop although the number of loops and hence the number of steam generators varies from plant to plant and commonly two, three, or four are employed.

The secondary side of the steam generator 25 is isolated from the primary loop by the heat exchange tubes 26. The water 27 in the steam generator 25 is placed into a heat exchange relationship with the primary coolant, whereby the water 27 is heated and converted to a vapor or steam. The vapor flows through a steam conduit 30 to the turbine 28. The steam, after passing through the turbine 28, is condensed in a condenser 31. The condensate or water is returned to the secondary side of the steam generator 25 through conduit 32. Thus, a recycling, secondary loop couples the steam generator 25 to the turbine 28.

Completing the description of the system shown in FIG. 2, a pressure differential sensor 33 measures the pressure differential between pressure taps 34 and 35 and produces a signal 37 representative of the water level 27 in steam generator 25. A sensor 36 measures the neutron flux in the reactor core (not shown) and produces a signal 38 representative of the reactor thermal power output level.

Figure 3:
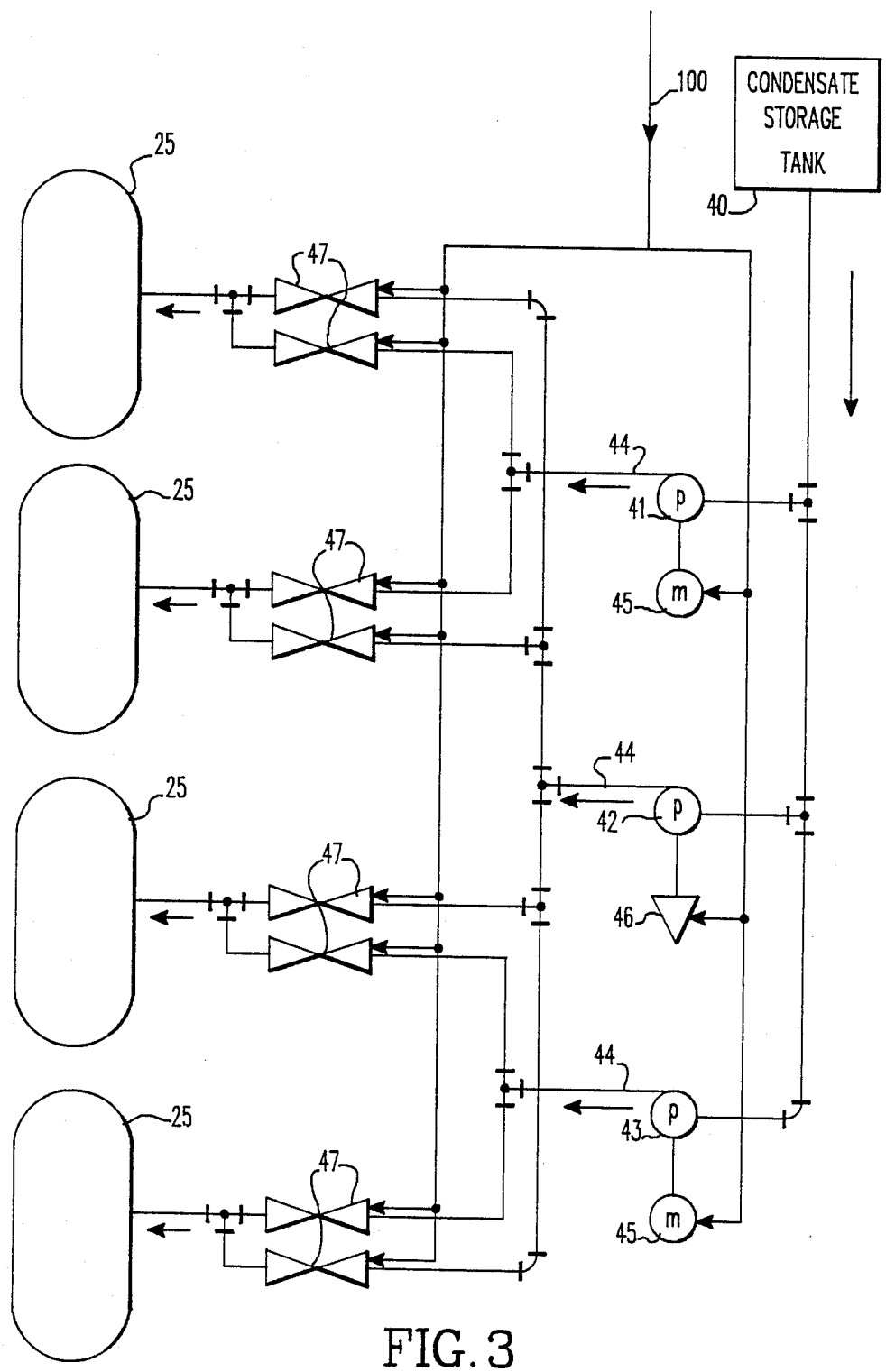
FIG. 3 illustrates a typical four steam generator auxiliary feedwater system.

FIG. 3 illustrates a simplified schematic of the auxiliary feedwater system in a typical four steam generator plant. Auxiliary feedwater pumps 41, 42, and 43 provide feedwater to steam generators 25 from a condensate storage tank 40, which is the source of the auxiliary feedwater, through auxiliary feedwater conduits 44. Auxiliary feedwater pumps 41 and 43 are driven by motors 45 while auxiliary feedwater pump 42 is powered by a turbine 46. Flow control valves 47 permit the regulation of auxiliary feedwater flow to each steam generator 25.

Figure 4:
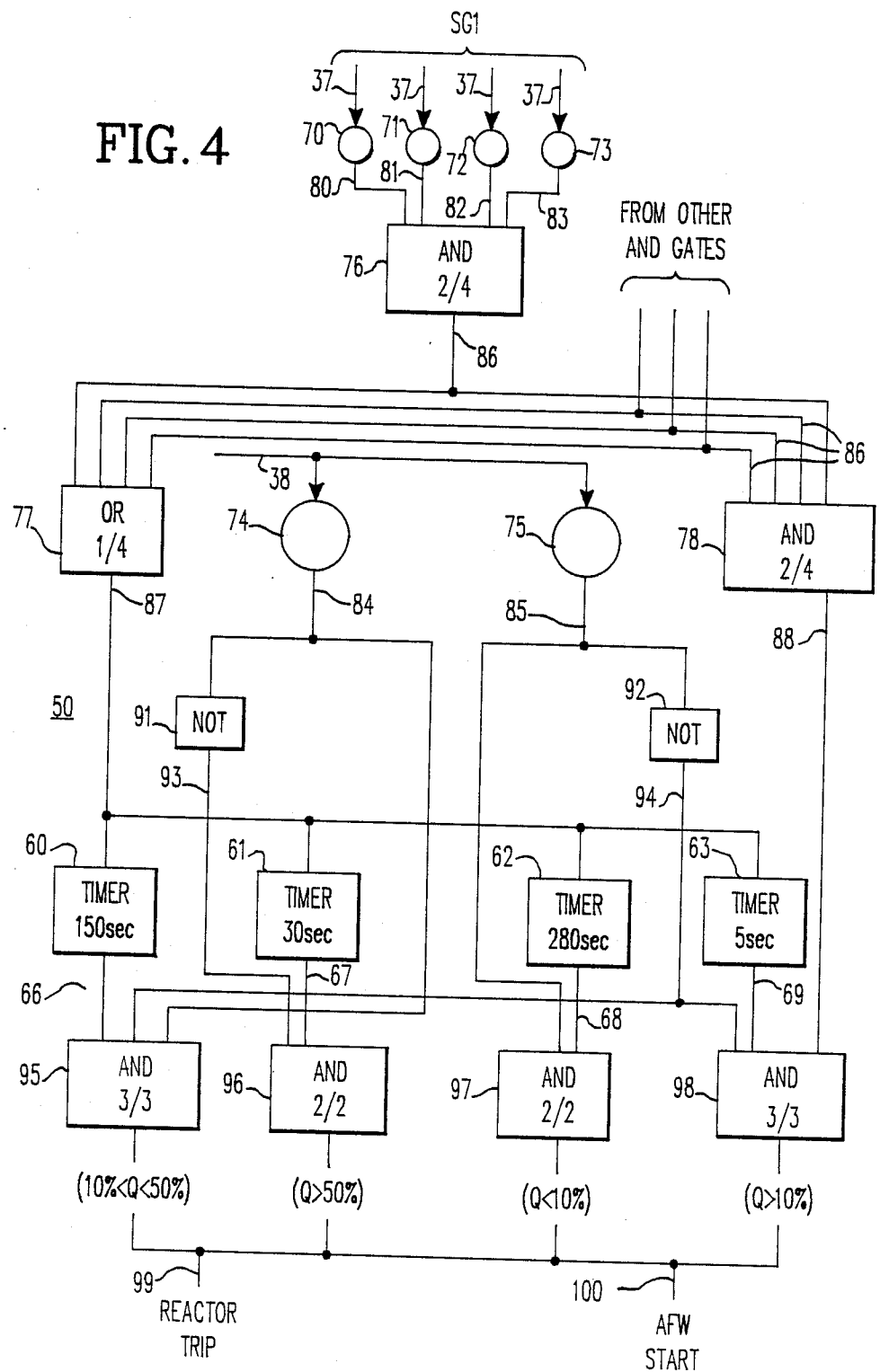
FIG. 4 illustrates a steam generator low water level reactor protection system constructed according to the teachings of the present invention.

Turning to FIG. 4, the diagram illustrates a steam generator low water level reactor protection system 50 constructed according to the teachings of the present invention. The reactor power output level signal 38 is input to two reactor power output level bistables 74 and 75 which produce output signals 84 and 85, respectively. The number of power output level bistables is indicative of the desired accuracy to which the power level must be ascertained for any particular implementation of this system.

The steam generator water level signal 37 may be input in parallel to four separate setpoint bistables 70, 71, 72 and 73 which are provided for each steam generator loop to satisfy safety redundancy requirements. The four water level setpoint bistables 70, 71, 72 and 73 produce signals designated by numerals 80, 81, 82 and 83, respectively.

The output signals 80, 81, 82 and 83 are inputs to an AND gate 76. The number of AND gate 76 corresponds to the number of steam generators. In order to insure that a valid low water level condition exists in the steam generator loop, the output signal 86 of the AND gate 76 will only indicate a low water condition if two out of the four water level bistables 70, 71, 72 and 73 indicate such a condition. The output signal 86 from each AND gate 76 drives both an OR gate 77 and an AND gate 78. A low water condition in any steam generator loop will cause a signal 87 to be available at an output of OR gate 77. Similarly, a low water condition in two or more steam generators will cause a signal 88 to be available at an output of AND gate 78.

Signals 84 and 85, the output signals produced by power output level bistables 74 and 75, respectively, may correspond to a high logic level when the power output of the reactor is less than fifty percent of Rated Thermal Power in the case of signal 84 and less than ten percent of Rated Thermal Power in the case of signal 85. Conversely, NOT gates 91 and 92, which are driven by signals 84 and 85, respectively, may provide high logic level output signals 93 and 94, respectively, when the power output of the reactor exceeds fifty percent of Rated Thermal Power in the case or NOT gate 91 and ten percent of Rated Thermal Power in the case of NOT gate 92. One NOT gate is provided for each power output level bistable included in the system.

Timers 60, 61, 62 and 63 are activated by the signal 87 generated by OR gate 77. Each of these timers is set to time out at a predetermined period of time which is acceptable under certain power level conditions and steam generator low water level conditions. Extensive analyses were performed to insure that all plant operating parameters remained within acceptable levels during the delay periods. Those analyses resulted in the curves shown in FIG. 5. One curve illustrates reactor trip and auxiliary feedwater actuation delay times in thousands of seconds as a function of power level in percent of Rated Thermal Power for a low water condition in one steam generator. The second curve illustrates the same information for a low water condition in two or more steam generators. Referencing these curves, and assuming worst case power output levels, timer 60 may be set for a delay of one hundred fifty seconds (one steam generator low level, power output at fifty percent of Rated Thermal Power), timer 61 may be set for a delay of thirty seconds (one steam generator low level, power output at one hundred percent of Rated Thermal Power), timer 62 may be set at two hundred eighty seconds (two or more steam generators low level, power output at ten percent of Rated Thermal Power) and timer 63 may be set for five seconds (two or more steam generators low level, power output at one hundred percent of Rated Thermal Power).

The output signal 66 of timer 60, the output signal 94 of NOT gate 92 and signal 84 drive AND gate 95; the output signal 67 of timer 61 and the output signal 93 of NOT gate 91 drive AND gate 96; the output signal 68 of timer 62 and signal 85 drive AND gate 97; the output signal 69 of timer 63, the output signal 94 of NOT gate 92 and the output signal 88 of AND gate 78 drive AND gate 98. This configuration results in the selection of one or more of timer output signals 66, 67, 68 and 69 the selection of which is safely allowable based upon the reactor power output level and the severity of the steam generator low water level condition. In the event that more than one of timer output signals 66, 67, 68 and 69 is selected, the signal 66, 67, 68 or 69 associated with the timer 60, 61, 62 or 63 corresponding to the shortest delay period will control the reactor protective functions.

AND gate 95 may produce a high logic level output at the expiration of one hundred fifty seconds if a low water level condition exists in one steam generator and the reactor power output level is between ten and fifty percent of Rated Thermal Power. AND gate 96 may produce a high logic level output at the expiration of thirty seconds if a low water level condition exists in one steam generator and the power output level of the reactor exceeds fifty percent of Rated Thermal Power. AND gate 98 may produce a high logic level output at the expiration of five seconds if a low water condition exists in two or more steam generators and the reactor power output level is in excess of ten percent of Rated Thermal Power. AND gate 97 may produce a high logic level output at the expiration of two hundred eighty seconds if the reactor power output is less than ten percent of Rated Thermal Power and a low water condition exists in one or more than one steam generator. Timer 62 controls the protective functions in this case regardless of the number of steam generators affected because the output of timer 63 will be blocked by AND gate 98 when the reactor power output level is less than ten percent of Rated Thermal Power. This design permits the selection of different time delays as either the number of steam generators affected by a low water condition changes or the reactor power output level fluctuates during a steam generator low water level condition. Additionally, should any protective action initiating conditions cease to exist, the system is reset and no protective actions taken. System reset is not desired when the reactor power output level has exceeded and then falls below one of the predefined power output levels and, therefore, latches (not shown) are provided. Specifically, the power output signals 84 and 85, and, therefore, signals 93 and 94, are latched so that if power levels fluctuate, reactor trip will still occur unless steam generator water levels return to a normal condition.

A signal generated at the output terminal of one of AND gates 95, 96, 97 and 98 will initiate reactor protective functions. A reactor trip signal 99 causes the control rods 23 in FIG. 2 to be inserted into the nuclear core (not shown) and thus halt the generation of heat. An auxiliary feedwater actuation signal 100 actuates motors 45 and turbine 46 in FIG. 3 to provide power to auxiliary feedwater pumps 41, 42 and 43. The auxiliary feedwater actuation signal 100 also opens the flow control valves 47 in FIG. 3 to permit the flow of auxiliary feedwater to steam generators 25.

Figure 5:
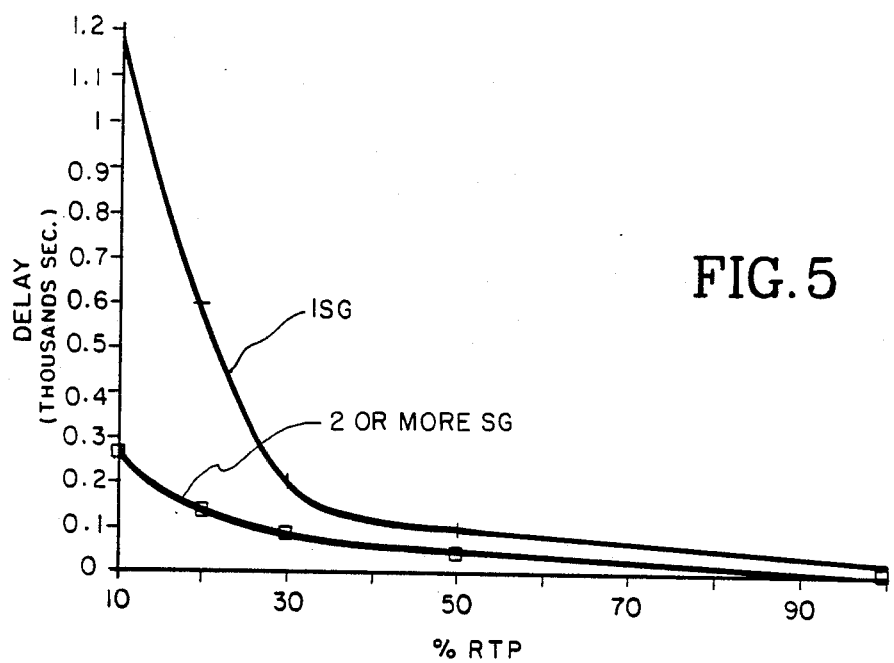
FIG. 5 illustrates two curves which depict allowable protective action delay as a function of reactor power output level.

The logic circuit shown in FIG. 4 illustrates one possible configuration of a system to variably delay reactor trip and auxiliary feedwater system actuation. The circuit can be expanded to accommodate any number of steam generator loops. The number of timers can also be varied depending upon how closely the curves of FIG. 5 are to be modeled.

Figure 6:
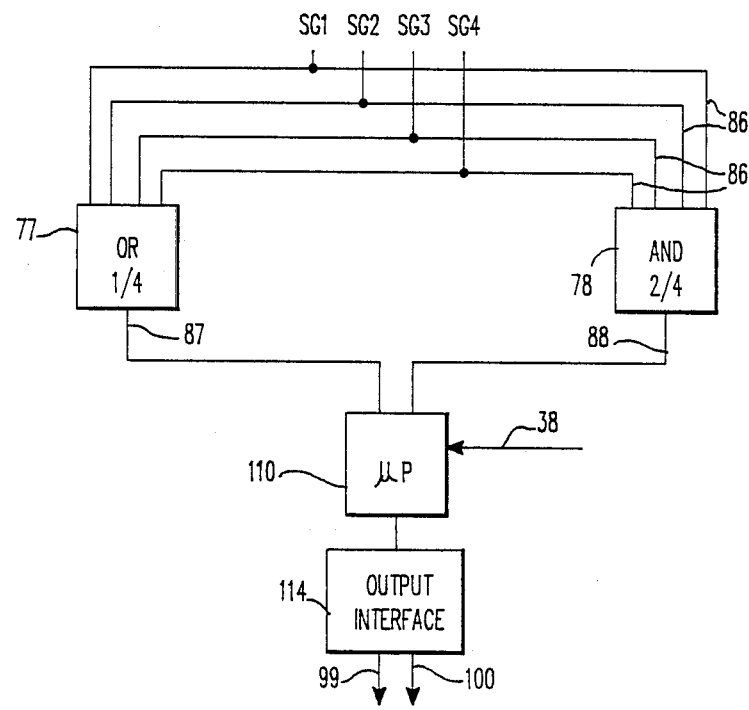
FIG. 6 illustrates another embodiment of a steam generator low water level reactor protection system constructed according to the teachings of the present invention.

An alternate implementation of the steam generator low water level reactor protection system of the present invention involves the use of a microprocessor 110 as shown in FIG. 6 in lieu of the logic circuitry of FIG. 4. As in FIG. 4, the output signal 86 from each AND gate 76 drives both the OR gate 77 and the AND gate 78. The signal 87, available at the output of OR gate 77 when a low water condition exists in any one steam generator, as well as signal 88, available at the output of AND gate 78 when a low water condition exists in two or more steam generators, are inputs to the microprocessor 110. The microprocessor 110 also receives the reactor power output level signal 38. The microprocessor 110 could be programmed with the curves shown in FIG. 5 to determine the appropriate delay, on a real-time basis, based upon the number of steam generators affected by the low water level condition and the reactor power output level. Signals 99 and 100 could then be generated by the microprocessor 110 and output through a known output interface 114 to initiate reactor trip and auxiliary feedwater system actuation, respectively, if the steam generator water level is not restored. A variation on this microprocessor implementation would incorporate a table containing the information of FIG. 5. The microprocessor 110 would be programmed such that the appropriate delay would be determined by referencing the table of delay times based upon the severity of the low water transient and the measured power output level.

While the present invention has been described in connection with exemplary embodiments thereof, it will be understood that many modifications and variations will be readily apparent to those of ordinary skill in the art. This disclosure and the following claims are intended to cover all such modifications and variations.

I claim as my invention:

1. A system for variably delaying a reactor trip resulting from a low water condition in a steam generator, comprising:
    means for determining whether a low water level condition exists in the steam generator;
    means for determining the power output level of the reactor;
    means for determining the length of a variable time delay in response to said steam generator low water level condition and said power output level; and
    means for tripping the reactor in response to said variable delay.

2. The system of claim 1 further comprising means for actuating the auxiliary feedwater system in response to said variable delay.

3. The system of claim 1 wherein said means for determining said low water level condition include means for determining the number of steam generators in which a low water level condition has occurred.

4. The system of claim 1 wherein said means for determining said power output level include means for comparing the thermal power output level of the reactor to predefined thermal power output levels.

5. The system of claim 4 wherein said predefined power output levels correspond to ten percent of Rated Thermal Power and fifty percent of Rated Thermal Power.

6. The system of claim 1 wherein said means for determining the length of said variable delay include a plurality of timers activated upon the detection of said low water level condition to produce output signals at various times and a plurality of logic gates which select one of said output signals based upon said low water level condition and said power output level.

7. The system of claim 6 wherein said plurality of timers correspond to time delays of five seconds, thirty seconds, one hundred fifty seconds and two hundred eighty seconds.

8. The system of claim 6 wherein said plurality of logic gates include a plurality of AND gates equal in number to said plurality of timers and a plurality of bistables and NOT gates each equal in number to predefined power output levels for producing signals indicative of the thermal power output of the reactor and wherein said AND gates are responsive to said output signals of said timers and said signals produced by said bistables and NOT gates to select one of said output signals.

9. The system of claim 7 wherein said logic gates are configured so that the reactor trip is delayed by five seconds if the power level exceeds ten percent of Rated Thermal Power and a low water condition exists in more than one steam generator, by thirty seconds if the power level exceeds fifty percent of Rated Thermal Power and a low water condition exists in only one steam generator, by one hundred fifty seconds if the power level is between ten percent and fifty percent of Rated Thermal Power and a low water condition exists in only one steam generator and by two hundred eighty seconds if the power level is less than ten percent of Rated Thermal Power and a low water condition exists in at least one steam generator.

10. The system of claim 1 wherein said means for determining the length of said variable delay include a microprocessor responsive to said low water level condition and said power output level.

11. The system of claim 10 wherein said microprocessor is programmed such that said variable delay is calculated as a function of said low water level condition and said power output level.

12. The system of claim 10 additionally comprising a table of time delays based upon said low water level condition and said power output level and wherein said microprocessor is programmed such that said variable delay is determined by referencing said table.

13. The system of claim 1 wherein said means for determining the length of said variable time delay determine said variable delay in accordance with the graph of FIG. 5.

14. A method for variably delaying a reactor trip resulting from a low water condition in a steam generator, comprising the steps of:
    determining whether a low water level condition exists in the steam generator;
    determining the power output level of the reactor;
    determining the length of a variable time delay in response to said steam generator low water level condition and said power output level; and
    tripping the reactor in response to said variable delay.

15. The method of claim 14 further comprising the step of actuating the auxiliary feedwater system in response to said variable delay.

16. The method of claim 14 wherein the step of determining said low water level condition includes the step of determining the number of steam generators in which a low water level condition has occurred.

17. The method of claim 14 wherein the step of determining said power output level includes the step of comparing the power output level of the reactor to predefined power output levels.

18. The method of claim 14 wherein the step of determining the length of said variable delay includes the step of determining a delay of five seconds if the power level exceeds ten percent of Rated Thermal Power and a low water condition exists in more than one steam generator, of thirty seconds if the power level exceeds fifty percent of Rated Thermal Power and a low water condition exists in only one steam generator, of one hundred fifty seconds if the power level is between ten percent and fifty percent of Rated Thermal Power and a low water condition exists in only one steam generator and of two hundred eighty seconds if the power level is less than ten percent of Rated Thermal Power and a low water condition exists in at least one steam generator.

* * * * *

UNITED STATES PATENT AND TRADEMARK OFFICE
CERTIFICATE OF CORRECTION

PATENT NO. : 4,832,898

DATED : May 23, 1989

INVENTOR(S) : Miranda et al

It is certified that error appears in the above-identified patent and that said Letters Patent is hereby corrected as shown below:

Title page item [75]: the following names should be added:

-- William J. Catullo, Jr., George M. Chambers, R. Bruce Bower, and Larry E. Erin. --

Signed and Sealed this

Twenty-eighth Day of May, 1991

Attest:

*Attesting Officer*

HARRY F. MANBECK, JR.

*Commissioner of Patents and Trademarks*